United States Patent [19]

Genie

[11] 4,248,835
[45] Feb. 3, 1981

[54] APPARATUS FOR EXTRACTING WITH A LIQUID PRODUCTS WHICH ARE PART OF SOLIDS

[76] Inventor: Guy V. Genie, 8 parvis Saint Roch, Chaumont-Gistoux, Belgium

[21] Appl. No.: 5,015

[22] Filed: Jan. 19, 1979

[30] Foreign Application Priority Data

Jan. 23, 1978 [BE] Belgium ................................ 863184
Jul. 14, 1978 [BE] Belgium ................................ 189270

[51] Int. Cl.$^3$ ............................................. B01D 11/02
[52] U.S. Cl. .................................... 422/272; 422/274; 422/275
[58] Field of Search ....................... 422/270, 272–274; 127/3, 5, 6

[56] References Cited
FOREIGN PATENT DOCUMENTS 556942 10/1943 United Kingdom .
614149 12/1948 United Kingdom .
1352350 5/1974 United Kingdom .

Primary Examiner—Hiram H. Bernstein
Attorney, Agent, or Firm—Wenderoth, Lind & Ponack

[57] ABSTRACT

An apparatus for the countercurrent extraction of liquids, forming a portion of solids, from such solids includes a rotary drum having an axis which is substantially horizontal. An inner partition is positioned within the drum and is substantially in the shape of a spiral formed by spiral turns having spaces therebetween. Each space has a raising element which lifts the solids from the liquid and a barrier over which the solids drop from the raising element and which stops the liquid and forces it back into an adjacent space during rotation of the drum. The raising element has a curvature such that the solids are lifted from the liquid and gradually drop in successive fractions over the barrier without sliding on the raising element.

42 Claims, 26 Drawing Figures

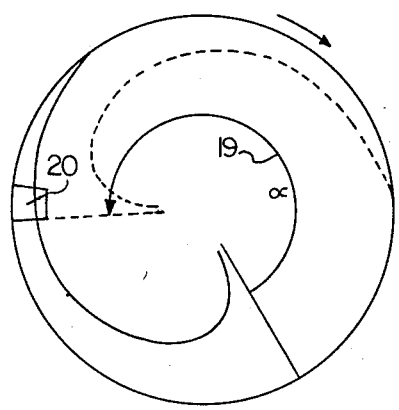
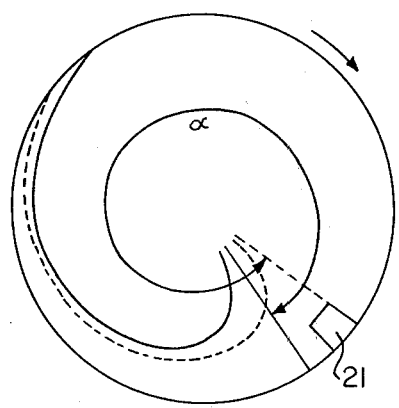
FIG. 7  FIG. 8
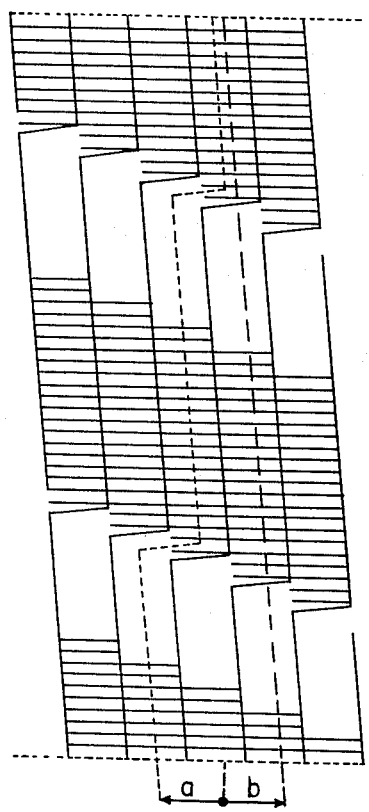
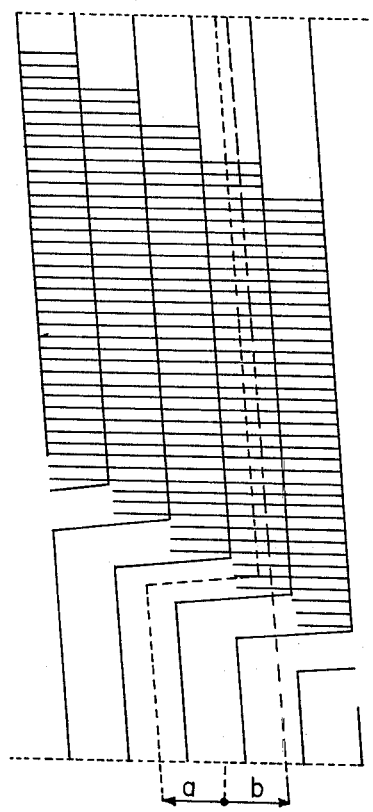
FIG. 9  FIG. 10

APPARATUS FOR EXTRACTING WITH A LIQUID PRODUCTS WHICH ARE PART OF SOLIDS

BACKGROUND OF THE INVENTION

The present invention relates to a rotary drum allowing countercurrent leaching of solids by a liquid for the purpose of extracting one or several components, in particular, the sucrose of sugar beets or sugar cane.

There are known various devices of this type including a rotary drum having a horizontal or slightly inclined axis, wherein the solids and the liquid circulate in opposite directions owing to a suitable structure, e.g. such as that described in Belgian Pat. Nos. 367,630 and 371,926. This known apparatus consists of a horizontal, large diameter drum which is divided into successive compartments by a helicoidal inner partition and by an arrangement of screens and/or perforate plates situated in a diametral plane. The rotation of the drum about its axis brings about an axial translation of the liquid, which occupies the lower portion of the drum and follows the spiral by passing through the screens. However, on each half-turn of the drum, the solids are stopped by the screens, are lifted by the screens to the upper portion of the drum and are made to glide by the screens into the preceding spiral turn through chutes arranged on the diametral plane in directions opposite to the direction of the spiral. Accordingly, during each complete revolution, the solids advance twice by a half pitch of the spiral toward its upstream end. That is, the solids advance at the same velocity as the liquid but in the opposite direction. A feature of this apparatus is that the arrangement of the screens in a diametral plane, which cannot be traversed by the solids, requires the division of the drum into two portions that must be alternately fed with solids on each half-turn of the drum.

According to a later apparatus described in Belgian Pat. No. 475,626, the spiral containing the circulated liquid possesses a double inlet, which doubles the translational velocity of the liquid in relation to that of the solids. The time of stay of the liquid in the drum is reduced by half, which is useful when the liquid rapidly deteriorates, as in the case of sweet juices. Accordingly, in addition to the two partial circuits of the solids, the liquid in this apparatus is separated into two parallel flows that never mix. These known devices are associated with several disadvantages:

(a) The chutes wherein the solids must glide against the direction of the spiral readily become clogged. In order to avoid this, it is necessary to provide a substantial slope, which requires a drum of large diameter, and a moderate speed of rotation, thus limiting the capacity of the apparatus.

(b) The countercurrent principle cannot be perfectly realized because, due to the presence of two separate circuits of solids that are alternately immersed into each of the two flows of liquid, the solids of a given circuit contact the same flow of liquid only once every two turns of the drum.

(c) The separation of the liquid and the solids is incomplete because the solids are stopped by the diametral screens and/or perforate plates having the effect of a vertical portcullis, against which the solids are heaped in a compact mass that obstructs the passage of the liquid.

(d) The position of the screens and/or perforate plates in diametral planes and the presence of the chutes crowding the axial portion of the apparatus geometrically restrict the size of the surface of such screens and/or plates.

(e) When the diametral plane passes beyond the horizontal, the liquid which continues to drain from the emerged solids no longer is separated from the solids, but is drawn by the slope of the diametral plane and precedes the solids in the direction of their gliding movement.

In order to correct the above deficient separation of solids and liquid, certain known devices were provided with perforate plates extended along the wall of the drum and the lateral walls of the compartments, or even with perforate plates facing each other and forming "spikes" perpendicular to the axis of the drum, that divide the compartments in the direction of the width. In order to correct the clogging of the chutes, according to a known apparatus described in Belgian Pat. Nos. 711,219 and 728,417, the solids are made to follow the spiral and the liquid circulates in a direction opposite thereto in radial channels, while the diametral plane separating the two circuits of solids and the presence of the two parallel flows of liquid are retained. However, the feature of the rotary drum of these known arrangements with the inlet for the solids on the upstream side of the spiral and the inlet for the liquid on the downstream side of the spiral claimed in such patents was previously known, e.g. from USSR Author's Certificate No. 76,594. The apparatus described in Belgian Pat. Nos. 711,219 and 728,417 is associated with an additional disadvantage in that the solids lifted to the upper portion of the drum by the above mentioned diametral planes are no longer retarded by passage in the chutes and glide rapidly as a compact mass. Such compact mass is not effectively dispersed in the liquid and even frequently forms a heap or dome that is not submerged in the liquid.

One attempt to eliminate the disadvantages of the diametral plane is described in Italian Pat. No. 478,054. The screens are no longer arranged diametrally but along a chord. The screens are doubled by a solid plate which extends substantially parallel to the screens which are shifted by 45° in relation to one another, so that the rate of displacement of the solids in relation to the drum amounts to seven-ninths of that of the liquid. This arrangement is associated with the grave disadvantage of unnecessarily complicating the transfer of liquid between the compartments, which transfer must be achieved by means of multiple pipe systems which are arranged outside the casing of the drum and which are liable to clog when solids are accumulated therein.

The above mentioned USSR Author's Certificate No. 76,594 describes a rotary drum having screens which are diametrally opposite but which have the shape of spring boards or steps on which the solids are lifted while the liquid traverses the screen, is dropped into the chamber situated below the spring board, is stopped by a solid wall and is forced back into the preceding spiral turn through an opening arranged in the wall of the spiral element. Under the effect of rotation of the drum, the solids then clear the spring board by gliding on the screens and drop beyond the solid wall into the lower portion of the drum that contains another fraction of the liquid. This apparatus is associated with the disadvantage that the height of the spring board, which determines the maximum level of the liquid, is insufficient because the spiral bands attached on the inner face of the drum leave open the axial portion thereof. Further, this apparatus will not prevent the liquid forced by inertia from clearing the spring board simultaneously with the solids. Accordingly, a drum of this kind can turn only very slowly with a low ratio of filling to volume, and therefore its productivity is insufficient for practical operation.

USSR Author's Certificate No. 135,425 describes an apparatus which is similar to the immediately above described known apparatus in principle, but which employs a double inlet spiral. The solids are lifted by plane screens whose sections perpendicular to the axis of the drum occupy positions of chords. The solids glide on the plane screens under the effect of rotation of the drum, while the liquid that traversed the screens is stopped by a solid wall and passes twice through the wall of the spiral element by means of radial ducts. In relation to the apparatus described in USSR Author's Certificate No. 76,594, this known apparatus possesses the advantage of better utilization of volume of the apparatus. However, the adoption of a double inlet spiral greatly complicates the structure, and the fact that the plane screens occupy a recessed position does not eliminate the above mentioned defects of the perforate diametral surfaces. Further, the gliding of the solids on the perforate surfaces should be avoided, due to erosion thus brought about and, especially in the case of sugar beet cossettes, due to damage to the cossettes and a resultant reduction in their permeability.

SUMMARY OF THE INVENTION

With the above discussion in mind, it is the object of the present invention to provide an apparatus which will avoid the above mentioned disadvantages of the prior art and which will improve the separation of the liquid and the solids by effecting a gradual dropping of the solids while preventing the solids from gliding on the perforate surfaces, which will allow a higher speed of rotation, and which will reduce the time of stay and increase the production capacity of the apparatus.

Another object of the invention is to simplify the construction and reduce the cost of the apparatus.

These objects are achieved according to the present invention by providing an apparatus including a cylindrical rotary drum having an axis which is horizontal or slightly inclined. The drum is equipped with an inner partition substantially in the shape of a spiral or helix which forms a conveying screw, hereinafter referred to as a spiral partition, defining a plurality of spiral turns and containing a series of components or structural elements employed for raising the solids from the liquid or for immersing the solids into a fraction of the liquid which is less concentrated in extracted substances, or for achieving advancement of the liquid in a direction opposite to that of the solids. The components or structural elements are shifted in relation to one another by a suitable angle in the median portion of the apparatus, and on the upstream side of the spiral partition are preceded by a spiral turn serving as an inlet for the solids and as an outlet for the liquid, and on the downstream side are followed by a spiral turn serving as an outlet for the solids and as an inlet for the liquid. Such two spiral turns contain modified components.

BRIEF DESCRIPTION OF THE DRAWINGS

Other objects, features and advantages of the invention will be apparent from the following detailed description, taken with reference to the attached drawings, by way of nonrestrictive example, wherein:

FIGS. 7 and 8 show two consecutive components employed for raising the solids from the liquid and the angle enclosed between the components, shown schematically as projections on planes perpendicular to the axis of the drum;

FIGS. 9 through 11 show portions of the cylindrical surface of the drum for various preferred values of the angle enclosed between the consecutive components employed for raising the solids from the liquid, respectively 186°, 372° and 244°, with the surfaces of the drum being schematically shown unrolled and flattened;

DETAILED DESCRIPTION OF THE INVENTION

Figure 1:
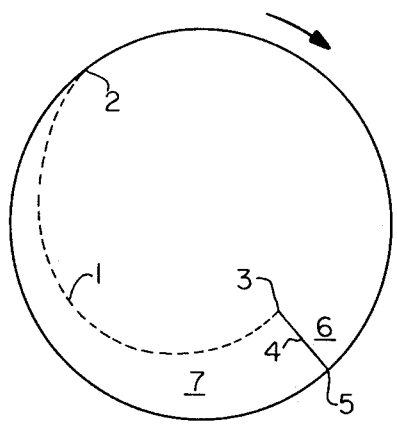
FIGS. 1 through 4 show various forms of structural components employed for raising the solids from the liquid, shown schematically as projections on planes perpendicular to the axis of the drum.

Like reference numerals designate identical or similar elements in the various figures of the drawings.

The description refers first of all to the components or structural elements situated in the median center portion of the apparatus. Between the turns of a spiral partition there are arranged elements for raising the solids. The section of such elements along a plane perpendicular to the axis of the drum is curved. Such an element 1 is represented in FIG. 1 and is followed by a barrier shaped transverse wall 4 which stops the liquid. The raising element 1 is attached to the drum at a point 2 and gradually spirally approaches toward the center of the drum up to a point 3, while lifting the solids from the liquid during the rotation of the drum. The liquid is gathered in a chamber 7 and is stopped by barrier 4 which is tightly attached to the drum at a point 5. Under the effect of the rotation of the drum, the barrier forces the liquid back into a preceding spiral turn through a channel passing through the spiral partition. At least one of the raising elements 1 possesses such a curvature that, during the rotation of the drum, the solids lifted from the liquid gradually drop in successive fractions beyond the barrier 4 into an area 6, without gliding on the raising element. At least one of the raising elements is attached to the barrier at at least one point.

The projection of at least one of the raising elements on a plane perpendicular to the axis of the drum corresponds to a portion of a curve such that a straight-line tangent to such curve sweeps over an angle of at least 90° when sliding from one end of the raising element to the other. That is, end 2 is vertical or already passed beyond the vertical when end 3 reaches the horizontal, so that the weight of the solids situated near point 3 prevents the solids situated near point 2 from gliding on the surface of the raising element. Accordingly, such solids are forced to drop gradually only after the drum has rotated by an amount such that each section of the raising element reaches the angle of natural slope of such solids, i.e. during a rotation of the drum through at least 90°.

According to one embodiment of the invention, the projection of at least one of the raising elements on a plane perpendicular to the axis of the drum substantially corresponds to a portion of spiral, preferably concentric to the drum, inscribed within a central angle of between 70° and 450°, one of the ends of the raising element being attached to the wall of the drum while the other end of the raising element is situated from the axis of the drum by a distance of between one-third and three-fourths of the radius of the drum. Of course, the spiral may be an Archimedean spiral or a logarithmic spiral. Thus, the term "central angle" defines the length, in angular terms, of the raising element, between the ends thereof, as viewed in such projected plane.

Figure 2:
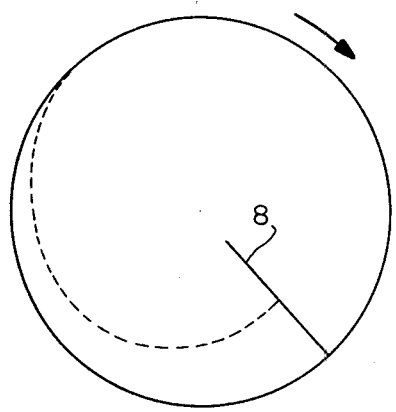

At least one of the barriers 4 may be extended beyond its point of attachment to the raising element 1 to a point spaced from the axis of the drum lower by an amount less than one-third of the radius of the drum, so as to additionally stop or retain all or a portion of the solids, as shown at 8 in FIG. 2. This increases the amount of solids that can be retained by the raising element.

Figure 3:
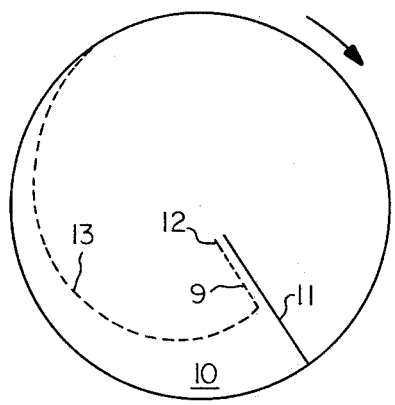

In order to facilitate the separation of the liquid, the extension of the barrier beyond the point of attachment of the raising element may be of double thickness. That is, the extension may consist of an inner portion that can be traversed by the liquid and that is joined to a raising element 13, and a solid outer portion 11 joined to barrier 4 so as to form a whole therewith, as shown in FIG. 3. In other words, the raising element 13 may be extended as at 9 to a position 12 spaced from the axis of the drum by an amount equal to that reached by the barrier, as shown in FIG. 3.

Portions 9 and 11 need not necessarily be parallel and radial as shown in FIG. 3, but may possess different inclinations and/or shapes. In fact, the pouring or overturning of the solids is completed when the drum is rotated to a position whereat portion 9 forms an angle with the horizontal that corresponds to the angle of the natural slope for the solids, and the draining of such solids ceases to be useful when portion 11 passes beyond the horizontal because the liquid then flows along portion 11 in the direction of end 12 and rejoins the solids from which it was just separated. It follows that the inclination of portions 9 and 11 should be selected in accordance with the requirements of a given operation and by the characteristics of the particular solids and liquid.

Figure 4:
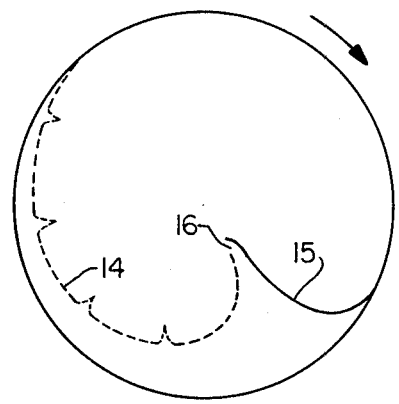

Further, it may be necessary or desirable to make portions 9 and 11 curved in order to avoid dead angles which are detrimental to effective draining and which allow the solids to collect and stagnate, particularly if the solids are spoilable. In particular, the curvature of the extended portion can be joined to that of the raising element, so as to form a single component 14, such as is shown in FIG. 4.

In an important embodiment of the invention the projection of at least one of the raising elements on a plane perpendicular to the axis of the drum substantially corresponds to a portion of an ellipse, or possibly to a portion of circle, inscribed within a central angle of between 70° and 270°, preferably between 90° and 180°, one end of the raising element being attached to the wall of the drum while the other end of the raising element is situated from the axis of the drum by a distance of less than three-quarters of the radius of the drum, preferably a distance of between one-tenth and one-third of the radius.

The curvature of the raising elements may also combine a spiral and an ellipse, i.e. the projection of at least one of the raising elements on a plane perpendicular to the axis of the drum substantially corresponds to a portion of spiral, preferably concentric to the drum, inscribed within a central angle of between 70° and 360°, one end of the raising element being attached to the wall of the drum and the other end of the raising element is extended by a portion of ellipse, or possibly a portion of circle, incribed within a central angle of between 70° and 270°, preferably between 90° and 180°, one end of which is situated from the axis of the drum by a distance of less than three-quarters of the radius of the drum, preferably a distance of between one-tenth and one-third of the radius.

As seen in FIG. 3, the raising element and the barrier are not joined at point 12, except for any points of attachment that are required for securing their mechanical rigidity. Rather, at least one gap or opening forming a swallow or throat for the liquid is provided between the barrier and the end of the raising element which is closest to the axis of the drum. The purpose of such gaps or openings is to prevent the liquid from being carried by its inertia to pass over the barrier. However, if the end of the raising element and that of the barrier are situated at the same distance from the axis of the drum, and if the rotation of the drum is very fast, the liquid may be raised by the raising element at the same time as the solids and may also at the same time clear the adjacent ends of the raising element and the barrier, so as to drop beyond the barrier into the following fraction of the extraction liquid, which is less concentrated in the extracted substance. In order to avoid this, according to a preferred arrangement provided in addition to the above mentioned gaps or openings, the distance between the axis of the drum and the end of the raising element which is closest to the axis of the drum is greater than the distance between the end of the barrier and the axis of the drum, so that any wave of liquid which may clear the end of the raising element is broken against the barrier and drops along the left side thereof (as shown in the drawings) rather than flowing over the end of the barrier. In order to assist this effect, the top of the barrier may also be slightly inclined or curved toward the raising element, so that a gap or opening 16 as shown in FIG. 4 is oriented toward the raising element rather than toward the axis of the drum, as is the case in FIG. 3.

The shape of the barrier may be selected from among a plane radial surface, a plane oblique surface, and a curved surface, e.g. a surface whose section along a plane perpendicular to the axis of the drum forms a portion of a parabola, such as that shown in FIG. 4 at 15. Since curved surfaces of this kind are difficult to make in industrial boiler manufacture, it is sufficient to approximate such shape by combining plane surfaces and cylindrical surfaces assembled by welding. Of course, other similar curved surfaces could be used without departing from the scope of the invention.

At least one of the raising elements is selected from among screens and perforate plates, preferably of mild steel or of stainless steel. The concave side of at least one of the raising elements may have extending therefrom at least one spur-shaped stop, which may consist of a flat, T-shaped or angular iron welded to the raising element. As shown in FIG. 4, the stop may also consist of a fold of the perforate plate extending parallel to the axis of the drum, and serving the triple purpose of avoiding any gliding of the solids on the raising element, of increasing the perforate surface, and of serving as a reinforcement. In order to accelerate the separation of the liquid and the solids, each separation surface may include additional perforate plates along the spiral partition, as is known in other types of rotary drums.

Figure 5:
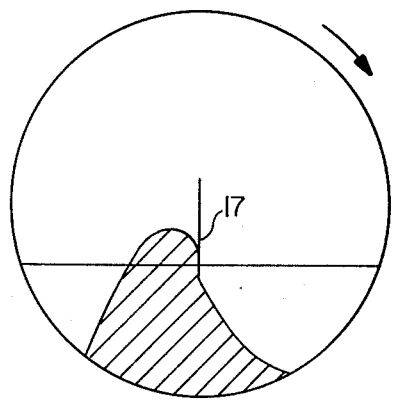
FIGS. 5 and 6 show two forms of the components employed for immersing the solids into a fraction of the liquid less rich in extracted substances, shown schematically as projections on planes perpendicular to the axis of the drum.
Figure 6:
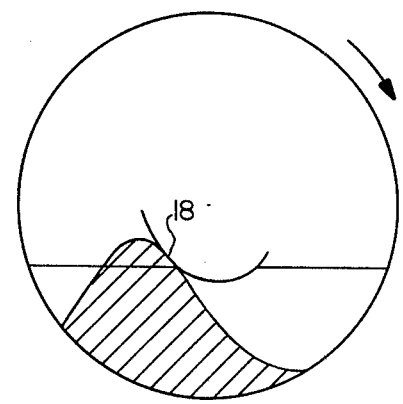

When one effects a gradual dropping of the solids in successive fractions, there is a minimal risk of forming a heap or dome of solids that are not submerged in the liquid. However, in order to eliminate such doming entirely, the inner structure of the drum may include at least one fixed component positioned between two consecutive raising elements at a distance from the surface of the drum substantially equal to the maximum desired height of the mixture of submerged solids and liquid. This fixed component forms an obstacle which, during the rotation of the drum, passes above the surface of the liquid and/or through the upper layer thereof, in order to sweep away any possible heap or dome of solids or to spread out the base thereof. The shape of such fixed component depends on the distance separating the two consecutive raising elements and may be selected from among a radially extending component, such as shown at 17 in FIG. 5, a plane surface extending oblique to the axis of the drum, a curved surface whose curvature is preferably concentric to the drum, such as shown at 18 in FIG. 6, and a set of plane surfaces joined to form a polyhedral shape, e.g. the tetrahedral shape whose precise description is given below. The fixed component is selected from among solid plates, perforate plates, screens and bars.

The following is a description of the modified components situated at the two opposite ends of the drum. On the upstream side, the spiral partition forms a turn serving as an inlet for the solids, incribed within a central angle of between 360° and 540°, preferably between 430° and 470°, whose width increases during the first revolution, which contains a raising element incribed within a central angle of at least 240°, preferably between 270° and 450°, whose width corresponds to that of the spiral turn. The barrier which follows such raising element is similar to the barriers of the central portion of the drum. The drum is closed at its end by a disk which extends perpendicular to the axis of the drum and which is traversed by a central opening through which the solids are introduced, preferably continuously, e.g. suspended in a transporting liquid. Between the point of contact of the spiral partition with the drum-closing disk and the first point of contact of the spiral partition with the barrier, the peripheral portion of the spiral partition is perforated in order to allow the outflow of the separated liquid toward the chamber situated under the raising element. The transporting liquid leaves the drum through several openings in the cylindrical wall, preferably all situated in the same plane perpendicular to the axis of the drum, and is gathered in a semicircular collector situated under the drum, such as 69 shown in FIG. 20. No transfer of liquid is provided between the inlet spiral turn and the following spiral turn. The extraction liquid fed from the median portion of the drum into such spiral turn leaves the drum through an opening (88 in FIG. 23) in the cylindrical wall of the drum situated near the inlet spiral turn, substantially at the place or level of the barrier, and is collected separately in a semicircular collector situated under the drum and joined to the preceding collector. The apparatus may likewise be supplied with the solids without the aid of a transporting liquid. In this case, the spiral turn serving as the inlet of the solids, and whose width increases during the first revolution, contains a raising element whose width corresponds to that of the spiral turn but which is incribed within a central angle similar to that of the raising elements contained in the center portion of the drum. Besides, a liquid transfer channel similar to that of the center portion of the drum is provided between the inlet spiral turn and the following spiral turn. Between its point of contact with the drum-closing disk and its first point of contact with the barrier, the spiral partition has at least one opening (90 in FIG. 25) through which a portion of the liquid that passed through the raising element is recycled and used again for transporting the solids introduced into the apparatus toward such raising element, jointly with the liquid which arrives from the following spiral turn through the transfer channel. The other portion of the liquid which passed through the raising element flows into a single semicircular collector situated under the drum, through a single opening in the cylindrical wall, substantially at the place or level of the barrier.

Figure 21:
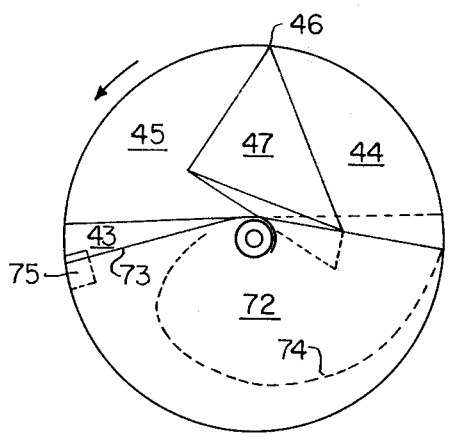

On the downstream side, the barrier of the spiral turn serving as an outlet for the solids is extended by a curved plate which surrounds in part a conveying screw concentric to the drum and is joined to the spiral partition so as to close the outlet spiral turn on itself such as shown at 73 in FIG. 21. During the rotation of the drum, the solids that would not be evacuated laterally by the conveying screw on which they fall, thus drop back onto the last raising element. The liquid is introduced, preferably continuously, through the hollow shaft of the conveying screw which corresponds to the liquid feed conduit in the drum that ends on the downstream side of the barrier preceding that of the spiral turn used as the outlet for the solids (81 in FIG. 23), from where the liquid flows by gravity alternately upstream and downstream of such barrier in accordance with the position of the drum. If one uses two liquids of different composition, a set of external valves controlled by the rotation of the drum can supply the two liquids alternately to the apparatus, e.g. in the case where sucrose is extracted from sugar beets, fresh water is supplied on the downstream side and water from the presses on the upstream side.

The projections of two consecutive raising elements on a plane perpendicular to the axis of the drum are shifted by an angle alpha, represented by an angle 19 in FIG. 7, considered in the direction of displacement of the solids. The apparatus of the invention can be constructed for any value of angle alpha higher than 90°, preferably between 180° and 480°. However, certain values are much more advantageous than others, both with regard to the costs of construction and also with regard to the efficiency of extraction and the productivity of the apparatus. Accordingly, the choice of the angle alpha is very important and is determined by a certain number of conditions that are listed below.

In order to balance the rotational torque, the raising elements are preferably distributed uniformly around the circumference of the drum, i.e. the product of the angle alpha and the number of the raising elements is close to a multiple of 360° incommensurable with the number of the raising elements. The choice is facilitated if the number of the raising elements is itself a prime number. For example, for thirty-one raising elements, the following angles are thus suitable: $16/31 \times 360° = 185.8°$, $21/31 \times 360° = 243.9°$ and $32/31 \times 360° = 371.6°$.

With regard to FIG. 7, the time required for the displacement of the solids from the raising element drawn by a solid line, which is situated in front of the plane of the drawing, to the raising element drawn by a discontinuous line, which is situated behind the plane of the drawing, is the time required by the drum to rotate through an angle alpha. However, the time required by the liquid for effecting the same trajectory in a reverse direction corresponds only to a rotation of $360° - \alpha$, because the liquid follows a shorter path that traverses the spiral partition through an opening situated at a point 20. Accordingly, the time of stay of the liquid and the time of stay of the solids in the drum are related as $360° - \alpha/\alpha$. If the angle alpha is 360°, the openings in the spiral partition are aligned along the same generatrix of the drum and form a short circuit between the inlet and the outlet for the liquid, whose duration of time of stay tends toward zero, which should certainly be avoided. When the angle alpha is greater than 360°, as shown in FIG. 8, the liquid traverses the spiral partition at a point 21 and arrives at the barrier drawn by a solid line after a rotation of the drum of $720° - \alpha$. The time of stay of the liquid and the time of stay of the solids in the drum are related as $720° - \alpha/\alpha$. However, in order to compensate for the additional axial translation of a pitch in the direction of the spiral, undergone by the liquid during the rotation, it is necessary that the liquid traverses the spiral partition twice in the opposite direction at point 21, rather than a single time. This requires a channel or duct, rather than a simple opening, in the spiral partition. Likewise, for an angle alpha included between 720° and 1080°, the ratio of the times of stay would be $1080° - \alpha/\alpha$, and the liquid should traverse the spiral partition three times, and so on.

Accordingly, the apparatus of the invention makes it possible to select at will the ratio of the time of stay for the liquid and the time of stay for the solids. It is determined by the angle alpha, which should be close to $n \times 360°/k + 1$, wherein k is the ratio of the time of stay of the liquid to the time of stay of the solids in the drum, and n is the number of times the liquid traverses the spiral partition when it is forced back by a barrier. For example, for an angle alpha of 244°, the time of stay for the liquid amounts to $(360-244)/244 = 0.475$ times that of the solids. This reduction in the time of stay for the liquid may be useful in the case where it spoils rapidly, e.g. in the case for sugar juices.

In order to increase the efficiency of the apparatus, it is necessary that the separated liquid be placed in contact with another portion of the solids without delay. That is, the angle alpha is preferably selected such that the gradual dropping of the solids under the effect of the rotation of the drum is more advanced in the spiral turn into which the liquid proceeds than in the spiral turn in which it is being separated from the solids and forced back. A delay may also be avoided when the angle alpha is such that the outflow of the liquid into the spiral turn toward which it is displaced is retracted until the solids start to drop over the barrier in such spiral turn under the effect of rotation of the drum, so that the liquid is retained for a longer time in the spiral turn which it leaves and remains in contact with the solids from which it is separated. The values of the angle alpha producing the best of these conditions depend on the nature of the solids, but are preferably comprised between 180° and 270° or between 360° and 450°. The delay in the outflow of the liquid may also be obtained by the selection of the position of the opening in the spiral partition or even of the position of the liquid transfer channel and the inclination thereof with respect to the axis of the drum. Many other elements may also affect the choice of the angle alpha, e.g. physical characteristics such as the permeability of the specific solids and the diffusion coefficient of the specific extracted substance, mechanical characteristics such as the geometrical arrangement of the apparatus, the facility of construction or access for servicing, the characteristics of use such as the rotational speed of the drum, the optimal unitary duration of immersion of the specific solids, the desired degree of extraction, etc.

Also, the conditions of extraction vary appreciably along the length of the drum due to changes in the physical properties of the solids and the exponential increase in the concentration of the extracted substance in the liquid, thereby justifying in certain cases a gradual increase in the unitary duration of immersion in the downstream direction of the extraction apparatus. Such gradual increase cannot be realized in any known apparatus. In order to obtain such gradual increase in the apparatus of the invention, it is sufficient that the angle alpha increases gradually, possibly stepwise, in the direction of advancement of the solids.

The value of the angle alpha finally employed results from a compromise between such various factors. The following are some nonrestrictive examples of angles of alpha used in the extraction of sucrose from sugar beets:

(1) When the available space is limited by an existing building, an angle alpha of 186° is of advantage as it allows the construction of a very short apparatus.

(2) When the climatic conditions make it difficult to preserve the beets, so that the produced juice is in a poor bacteriological state and rapidly spoils, an angle alpha of 244° or 279° is of advantage as it reduces the time of stay of the juice in the apparatus to one-half or one-third of the time of stay of the beet cossettes.

(3) When one seeks a maximal productivity, an angle alpha of 372° or greater is of advantage as it makes it possible to increase the height of the barrier and to thus improve the coefficient of utilization of the volume of the apparatus.

Figure 11:
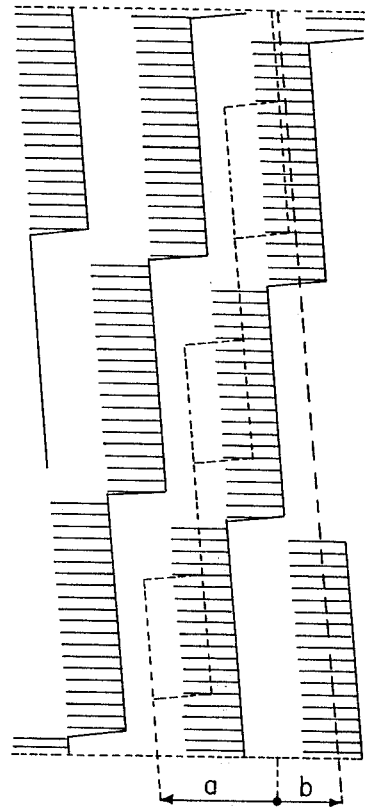

A fragment of the unfolded and flattened surface of a drum in section along a generatrix of the drum is shown in FIG. 9 for an angle alpha of 186°, in FIG. 10 for an angle alpha of 372° and in FIG. 11 for an angle alpha of 244°. The dotted lines correspond to the generatrix along which the section is taken, and the solid lines indicate the lines of contact of the spiral partition and the barriers with the surface of the drum. The lines of short dashes and of long dashes indicate the paths followed respectively by the liquid and the solids, and illustrate the displacements thereof axially of the drum during a complete revolution of the drum, represented by the vectors a for the liquid and b for the solids. The shaded areas correspond to the projections of the raising elements on the surface of the drum. For certain values of the angle alpha and especially in the case of the angle alpha of 244° shown in FIG. 11, the raising elements situated in two adjacent spiral turns do not correspond to each other on either side of the spiral partition. Therefore, the opening situated under the raising element may equal the latter in length, and the spiral partition may be made of a perforate plate above the raising element, so that the liquid can pass through it as soon as it is separated from the solids.

Figure 12:
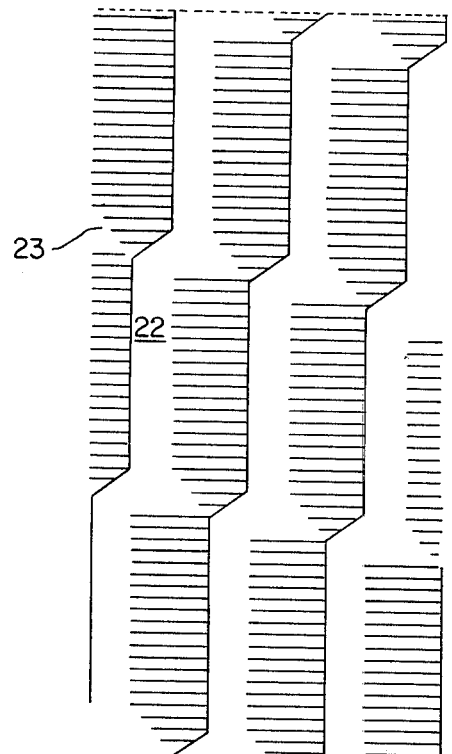
FIG. 12 is a view similar to FIG. 11, but illustrating a modified spiral partition.

Further, the spiral partition separating two spiral turns may be displaced in the axial direction in the area corresponding to at least one raising element in order to increase the width, without a reciprocal obstruction between the raising elements and without increasing the length of the drum, provided that the immersion channel situated between the raising elements is reduced accordingly. FIG. 12 shows one such example for a displacement of this kind in the case where the angle alpha amounts to 244°. The raising element ends in an oblique plane 23 in order to direct the solids toward an immersion channel 22 owing to the narrowing thereof.

In order to take into account the combined reduction in the volume of solids and in the volume of liquid on the downstream side, which may reach 30% in the case where one extracts sucrose from sugar beets, the apparatus of the invention may also be constructed with a spiral partition having a variable pitch and a width which gradually decreases, possibly stepwise, in the direction of the advancement of the solids.

Of course, the entire above explanation which is made with respect to a drum containing a single partition may also be applied to a drum containing two or more intertwined spiral partitions.

The following is a description of a practical embodiment of the apparatus of the invention which may be manufactured with plane plates using ordinary methods of industrial boiler making, with certain variables with regard to the angle alpha and while avoiding the construction of a perfect spiral partition. The inner substantially spiral partition comprises a series of concentric circular segments, preferably perpendicular to the axis of the drum, each segment being connected to the following segment by at least one oblique flap. According to an advantageous embodiment, the circular segments are shifted by the angle alpha in relation to one another around the axis of the drum.

Figure 13:
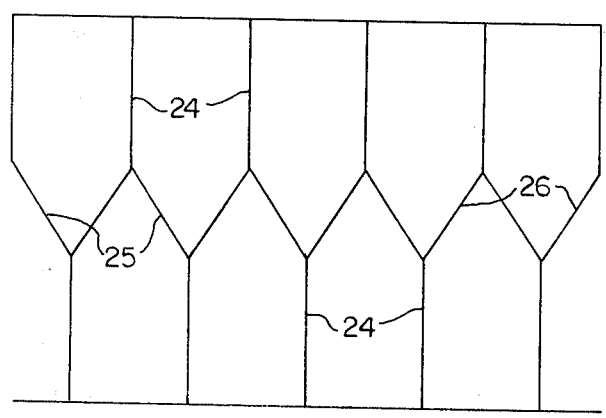
FIGS. 13 and 14 are schematic respective elevation and section views of the drum for an angle of 180° between the consecutive components employed for raising the solids from the liquid.
Figure 14:
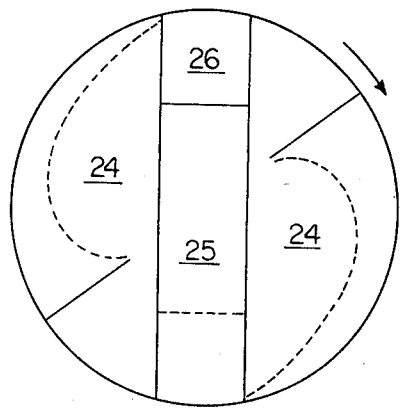

For an angle alpha of 180°, the apparatus comprises alternating circular segments 24, perpendicular to the axis of the drum, connected to one another by flaps 25 and 26 inclined in opposite directions, as shown in the elevation of FIG. 13 and in the section of FIG. 14. The drum is thus divided into a certain number of semicircular chambers each containing a raising element and a barrier, such as described above, between parallel circular segments 24. Adjacent chambers communicate one with another due to an opening in the oblique flaps. Each flap rejoins the surface of the drum only at a single end, i.e. the upper end of flap 26 and the lower end of flap 25, as seen in FIG. 14. The opposite ends of the flaps are discontinued, i.e. the top end of oblique flap 25 and the bottom end of oblique flap 26 as shown in FIG. 14, at a distance from the surface of the drum which practically equals the maximum height of the mixture of the submerged solids and the liquid, so as to submerge any solids possibly emerging from the liquid.

Figure 15:
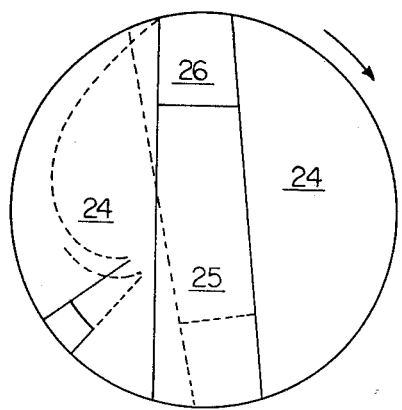
FIG. 15 is a view similar to FIG. 14, but for an angle of 186°.

In order to employ an angle alpha greater than 180°, for instance 186°, every circular segment 24 must be turned about the axis of the drum by an angle of 6° with respect to the preceding circular segment, as shown in FIG. 15. Consequently, oblique flaps 25 and 26 are deformed and skewed, and it may be necessary to form the oblique flaps from two or three parts assembled by welding in order to allow their manufacture by means of commercially available plane plates. On the other hand, the rotation of circular segments 24 breaks the alignment of the barriers and establishes a corresponding area on either side of circular segments 24 between the chamber situated under the raising element, i.e. behind the plane of the drawing, and the immersion channel situated beyond the barrier into which the liquid is to proceed, i.e. in the spiral turn situated in front of the plane of the drawing. Accordingly, it is sufficient to provide an opening in this area in circular segment 24 in order to allow the passage of the liquid between the two spiral turns.

In order to avoid buckling of the oblique flaps, which is especially useful for angles of alpha close to 240°, in place of circular segments, the inner substantially spiral partition comprises a series of portions of a circle delimited by two rectilinear segments, preferably differing at the ratio of 5/4 and including the angle alpha, the point of intersection of the two segments being spaced from the axis of the drum by a distance of between one-tenth and one-half of the radius of the drum, preferably one-third thereof. Such portions of a circle are shifted by the angle alpha in relation to one another. The rectilinear segments delimiting such portions are parallel in pairs and are joined by plane oblique flaps, so as to form a deformed spiral. An auxiliary plane surface of substantially trapezoidal shape, intended for submerging any solids possibly emerging from the liquid, is provided between two consecutive circular portions and is limited by a straight line which joins the points of intersection of the rectilinear segments that delimit such circular portions, by the shorter one of the two rectilinear segments delimiting the downstream circular portion, by the intersection of the plane so defined with the upstream portion of circle and by the rectilinear segment which joins the points of intersection of such plane and the two circular portions, which points are situated at a position spaced from the surface of the drum by a distance substantially equal to the maximum height of the mixture of the submerged solids and the liquid. The raising elements and the barriers as described above are inscribed within a central angle close to $360° - \alpha$ and are situated between two circular portions of odd or even series and the oblique flaps joining them to the circular portion included between them. In order to facilitate the outflow of the liquid, the barrier is preferably inclined in relation to the axis of the drum.

Figure 16:
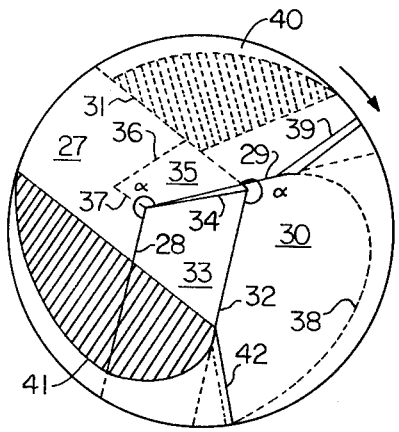
FIG. 16 is a sectional view of the drum for an angle of 244°.

These elements are shown in FIG. 16 for an angle alpha of 244°. An upstream circular portion 27 is delimited by rectilinear segments 28 and 29 (minus an opening 39) and is situated in front of the plane of the drawing. A downstream circular portion 30 is delimited by rectilinear segments 31 and 32 (minus an opening 42) and is situated in the plane of the drawing. The two circular portions 27 and 30 are shifted by 244°. Rectilinear segments 28 and 32 are parallel and are joined by an oblique flap 33, one end of which terminates at the opening situated under a raising element 41, and the other end of which terminates at a rectilinear segment 34, which joins the two points of intersection of rectilinear segments 28 and 29 and 31 and 32. The shaded areas of oblique flap 33 and of circular portions 27 and 30 are perforated. A plane auxiliary surface 35, situated between circular portions 27 and 30, is limited by rectilinear segments 34, 31 and 36, as well as rectilinear segment 37 which is situated in the plane of circular portion 27. The path of the solids during a revolution will now be described. The solids are lifted by a raising element 38 and clear a slightly inclined barrier 29 which is situated in front of the plane of the drawing between circular portions 27 and 30. The solids then are submerged in the liquid arriving from another raising element situated behind circular portion 30, i.e. behind the plane of the drawing, through an opening 40 or through perforations corresponding to the area shaded by dotted lines, then pass under surface 35 which sweeps away any possible heap or dome of solids, then are lifted by raising element 41, thus separating liquid from the solids, the liquid flowing away likewise in part through the shaded area, and then drop over barrier 42 and pursue their path behind circular portion 30.

Figure 17:
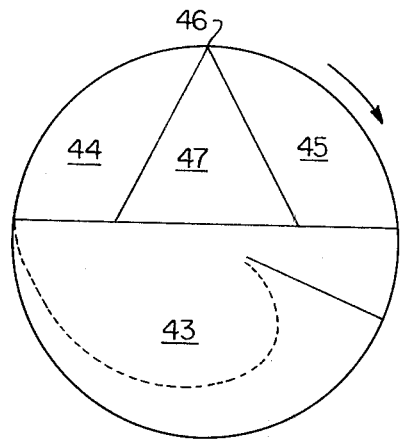
FIGS. 17 and 18 are schematic respective section and elevation views of the drum for an angle of 360°.
Figure 18:
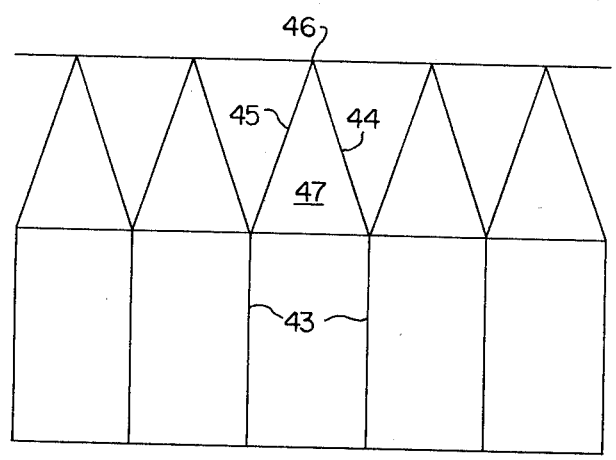

For an angle alpha of 360°, circular segments 43 are aligned along the same generatrix and are joined by two flaps 44 and 45 which are inclined in opposite directions and which contact each other at a point 46. The flaps 44 and 45 are joined together by a triangular-shaped member 47 whose base spans across the space included between two successive circular segments 43 and containing a raising element and a barrier, such as described above, as shown in the cross-section of FIG. 17 and in the elevation of FIG. 18.

Figure 19:
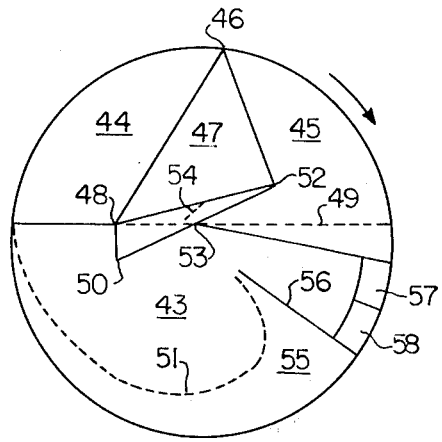
FIG. 19 is a schematic sectional view of the drum for an angle of 372°.

FIG. 19 shows the section of a drum for an angle alpha of 372°. There is required an additional component in the shape of a tetrahedral angular element, in order to avoid the dropping of the solids on the wrong side of triangular-shaped member 47 which would retain the solids indefinitely in the same spiral turn. The apex of the tetrahedral angular element is situated at a point 48 on a chord 49 which subtends circular segment 43, thus forming one side of the tetrahedral angular element. Another side is perpendicular to the plane of FIG. 19 and contacts at a point 50 the preceding circular segment (which is not shown) situated in front of the plane of the drawing. This side has the shape of a rectangular triangle whose rectilinear segment 48-50 forms the hypotenuse and is employed mainly for submerging any solids possibly emerging from the liquid before reaching a raising element 51. Finally, the two other sides of the tetrahedral angular element are determined by its edge 48-52, which is the base of triangle 47, whose apex 52 is slightly shifted toward the wall of the drum in order to increase the cross-section of passage for the solids above a barrier 56, which involves an extension of oblique flap 45 that is situated in front of the plane of the drawing, to a point 53 in the direction of point 50. The side of the tetrahedral angular element included between points 48, 52, 53 and 50 is joined tightly to oblique flap 45 and to the preceding circular segment that is not shown in the drawing and includes points 50 and 53. The side of the tetrahedral angular element included between chord 49 subtending circular segment 43 and line 48-52 is necessary for avoiding the mixing of liquid fractions situated on either side of circular segment 43 when the rotary motion brings point 48 to its lowest position. This side has the shape of a triangle whose side 54 opposite apex 48 is sufficiently near the axis of the drum so that it cannot be immersed, but without hindering the dropping of the solids. Its presence makes it possible to raise the level of the mixture of the immersed solids and the liquid up to 0.8 to 0.9 of the radius of the drum, i.e. to increase the coefficient of utilization of the volume of the apparatus and to thus improve its productivity. The path of the solids during a revolution is as follows. Passing under the surface represented by rectilinear segment 48-50, which effects the submersion of any solids possibly emerging from the liquid, the solids are lifted by raising element 51 through which the liquid flows into a chamber 55, whereafter the solids drop over barrier 56 and pass behind oblique flap 45. The solids receive another liquid fraction, which is less concentrated in extracted substance and which arrives from behind the plane of FIG. 19 through a channel 57. The solids pass in sequence behind triangle 47, behind oblique flap 44 and behind circular segment 43, where another raising element separates them from the liquid, which returns through a channel 58 to the spiral turn situated in front of that represented in FIG. 19.

Figure 24:
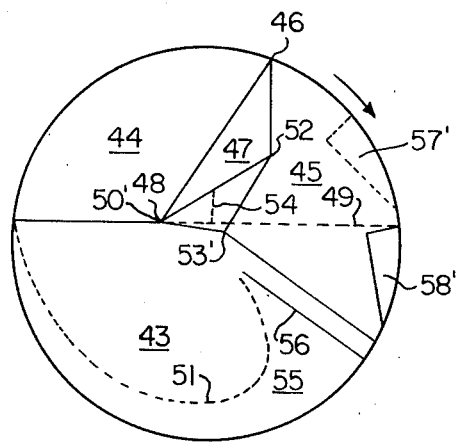
FIG. 24 is a view similar to FIG. 19, but for the angle of 395°.

FIG. 24 shows a variant of FIG. 19 for an angle alpha of 395°, the arrangement of the tetrahedral angular element being different. The apex of the tetrahedral angular element, whose cavity is turned toward the exterior of the drum and no longer toward the axis of the drum, is situated at point 48 on chord 49 which subtends circular segment 43. Oblique flap 44 forms a side of the tetrahedral angular element. Another side is perpendicular to the plane of FIG. 24 and at a point 50' contacts the preceding circular segment, which is not shown and which is situated in front of the plane of the drawing. This side has the shape of a rectangular trapezoid whose rectilinear segment 50'-53' forms the large base (situated in front of the plane of the drawing) and whose rectilinear segment 50'-48 corresponds to the prejection of the small base (situated in the plane of the drawing). For the sake of clarity, the projection of the trapezoid is shown as distinct from chord 49, however the two are merged in practice. In addition to its function of sweeping away any heap or dome of solids possibly emerging from the liquid, the trapezoid lifts and turns over the solids that could not be submerged, so as to add such solids to the following fraction. In this manner one maintains equality among the successive fractions of solids while avoiding local excesses. The two other sides of the tetrahedral angular element are determined by its edge 48-52, which is the base of triangle 47. The sides of the tetrahedral angular element between points 48, 46, 52, 53' and 50' are tightly joined to oblique flap 45 and to the preceding circular segment (which is not shown) which contains points 50' and 53'. An auxiliary wall between chord 49 and line 48-52 is necessary for avoiding the mixing of the liquid fractions situated on either side of circular segment 43 when the rotary motion brings point 48 to its lowest position. This wall has the shape of a triangle whose side 54 opposite apex 48 is sufficiently close to the axis of the drum so that it is never submerged. Due to the increase in the angle alpha, barrier 56 and channels 57' and 58' are separated from each other instead of being adjacent as in the case of FIG. 19. Also, channels 57' and 58' have a beveled profile so that a portion of the solids is not retained during the rotation of the drum. When barrier 56 is displaced under the effect of rotation of the drum, its upstream side (in relation to the motion of the solids) forces back the liquid which traversed raising element 51. However, the downstream side of the barrier can receive the following liquid fraction only when channel 57' reaches a level sufficiently low for opening the passage of such liquid. Accordingly, as the barrier is shifted, a vacuum is formed behind it, which is filled up after a delay corresponding to the time required by the drum to rotate about 45°, i.e. at the instant when the solids lifted by raising element 51 being to drop over barrier 56. On the one hand, the liquid is used more effectively, since the time of its contact with the preceding fraction of solids is extended. On the other hand, the outflow of the liquid through channel 57' involves a distinct lowering of the level of the liquid in the spiral turn from which it flows, which makes it possible to increase the capacity of the apparatus for the same height of the barrier.

Figure 27:
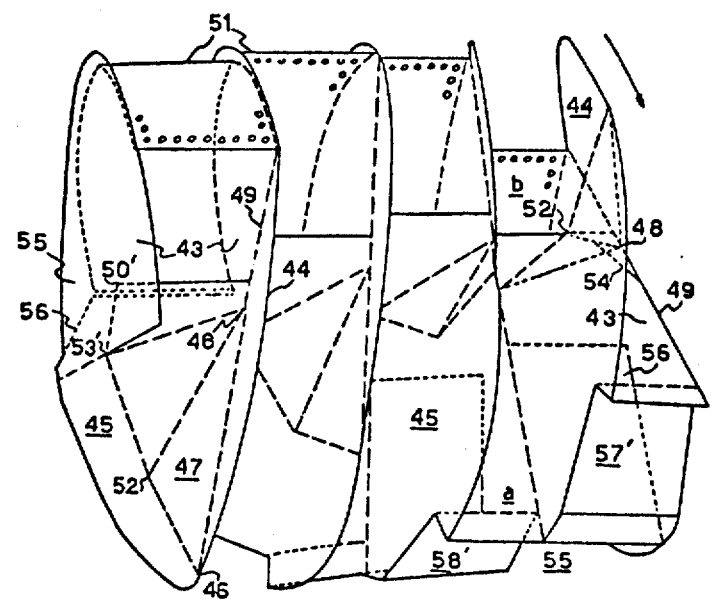

FIG. 27 is a perspective view, in more detail, of the apparatus of FIG. 24, for an angle alpha of 395° (which is the definitive design). The reference numerals of FIG. 27 correspond to those of FIG. 24, but with the cylindrical envelope of the drum removed. The plain lines represent the visible contours of the spiral partition, with the notches corresponding to the liquid channels, and of the raising elements. The lines of short dashes represent the parts of these contours which are not visible. The lines of long dashes represent folded or welded edges of the internal structure. The raising element 51 can best be seen at the upper left corner, while only a small part of the barrier 56 is visible at the right side of the figure. Owing to the value of the angle alpha, each compartment is offset by 35° with respect to the preceding compartment, and the tetrahedral element, described in detail above, is best seen in the left-hand compartment and appears under various angles in the following ones. The auxiliary wall described above is shown in the right-hand compartment, only a small part of it being visible. When the drum rotates, the solids follow the screw and are moved from the left to the right. The solids dropping over the barrier in a are immersed in a liquid portion arriving from the right through channel 57'. They reach the raising element at b and pass under the edge of the trapezoid (better shown as 50', 53', 48 at the left side of FIG. 27) which sweeps any possible heap or dome of solids. The liquid then flows through the holes into chamber 55 situated under the raising element and is forced back to the left through channel 58' by barrier 56 while the raised solids are dropped over the barrier, and so on.

Figure 20:
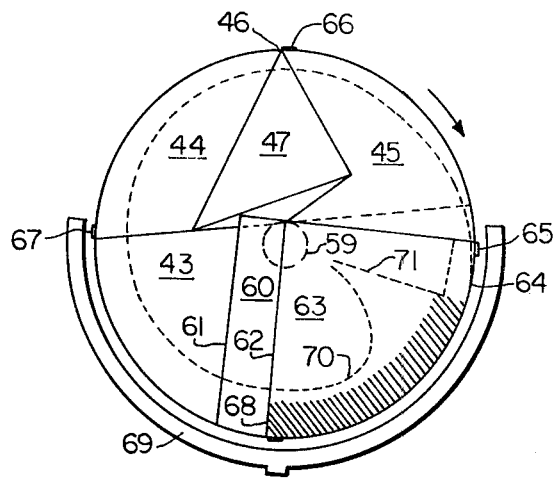
FIGS. 20 and 21 are sectional views of modified components of the spiral turn serving as an inlet for the solids and an outlet for the liquid, and of the spiral turn serving as an outlet for the solids and an inlet for the liquid, respectively.

FIG. 20 shows the inlet spiral turn, but with the drum-closing end disk removed. Circle 59 indicates the position of the inlet opening. An oblique flap 60 has an edge 61 which contacts the above mentioned end disk and an edge 62 which contacts a surface 63 having the shape of a half circular segment which is perpendicular to the axis of the drum and which has a peripheral shaded portion which is perforated. At a point 64, there begins a raising element 70 including a spiral section inscribed within a central angle of 270° followed by an elliptical portion inscribed within a central angle of 90°. Surfaces 45 (welded to surface 63), 47, 44 and circular segment 43 (partly hidden by surfaces 60 and 63) form the start of a spiral partition such as shown in FIG. 19, and the raising element 70 included between such surfaces and the drum-closing end disk widens out gradually to about four-thirds of its normal width. As it passes behind oblique flap 60, the width of raising element 70 is reduced to the normal size, which is preserved behind surface 63. At least four peripheral openings are provided at points 65, 66, 67 and 68 for evacuating the liquid and for discharging the liquid in turn into a semicircular collector 69. The path of the solids during a revolution is as follows. The solids are fed continuously, while suspended in a transporting liquid, through opening 59 and drop into the space between the drum-closing end disk and surface 63. The transporting liquid passes through the shaded area and flows out into collector 69 through openings 68 or 65. When a barrier 71 reaches or passes beyond the vertical, the transporting liquid passes through the raising element and is evacuated in succession through openings 66, 67 and 68 to collector 69, while the solids gradually increasing in quantity drop onto the raising element whose width increases for such purpose, until the instant when oblique flap 60 cuts off the entry of the solids and a new cycle of accumulation begins. The accumulated solids then pass behind surface 63, are lifted by a raising element 70, are drained and drop beyond barrier 71 as described above. In order to avoid sliding of the solids on the raising element, the latter is equipped with spur-shaped stops, that are not shown and are such as described above.

Figure 25:
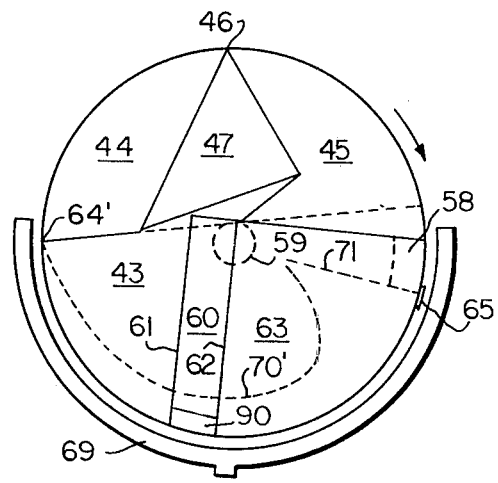
FIGS. 25 and 26 are views similar to FIGS. 20 and 23, respectively, but showing a modification wherein the solids enter the apparatus without the aid of a transporting liquid; and, FIG. 27 is a detailed perspective view of the interior of the apparatus shown in FIG. 24.

FIG. 25 shows another embodiment of the inlet spiral turn provided for the case where the solids are fed into the apparatus without a transporting liquid. This embodiment differs from that shown in FIG. 20 by the elimination of the perforate portion in surface 63 and openings 66, 67 and 68, by the presence of a channel 58, and by a shorter raising element 70', which starts at a point 64', its width in this position being approximately 50% greater than the normal width. As it passes behind oblique flap 60, the raising element is reduced to the normal width, which is preserved behind surface 63. Due to an opening 90 provided at the base of oblique flap 60, a portion of the liquid which passed through raising element 70' can flow or spread between surface 63 and the drum-closing end disk. The other portion of the liquid which passed through raising element 70' flows out of the drum through opening 65 and is gathered in semicircular collector 69. The path of the solids during a revolution is as follows. The solids continuously enter through opening 59 and drop into the space between the drum-closing end disk and surface 63, wherein the solids are immediately submerged in the liquid portion that entered through opening 90. Another liquid fraction arriving from the spiral turn situated behind the plane of FIG. 25 is then added to the mixture through channel 58, while the solids, the quantity of which gradually increases to the instant when oblique flap 60 cuts off the entry of the solids and a new cycle of accumulation begins, are transported while suspended in the liquid toward raising element 70' under the effect of rotation of the drum. The solids are then lifted by raising element 70' and drop over barrier 71.

The section of FIG. 21 shows the outlet spiral turn seen from the other end of the drum. Circular segment 43 (hidden for the most part), oblique flap 45, triangle 47 and oblique flap 44 form the end of the spiral partition, which emerges into a chamber limited by circular segment 43, by a surface 72 perpendicular to the axis of the drum, by the cylindrical surface of the drum and by a barrier 73 which is extended around a conveying screw concentric to the drum and which is joined to the spiral partition so as to close the spiral turn on itself. This chamber contains a final raising element 74 and a liquid outlet channel 75 which passes through circular segment 43.

Figure 22:
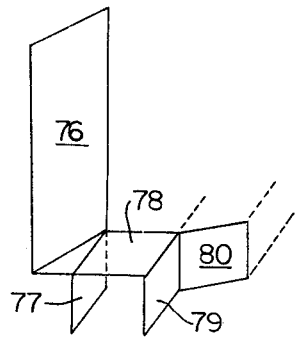
FIGS. 22 and 23 are schematic respective perspective and elevation views of a portion of the components that secure the advance of the liquid in a direction opposite to the solids.
Figure 23:
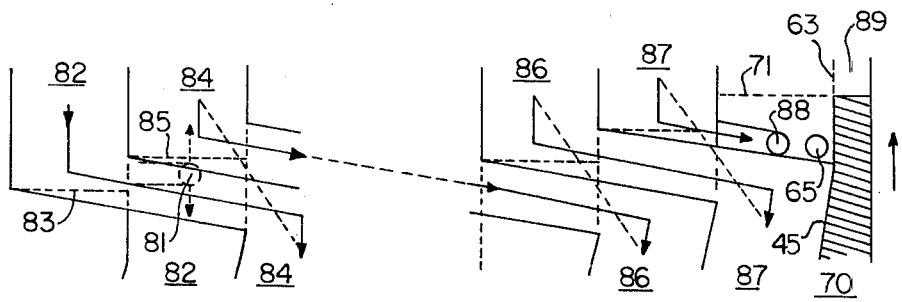
Figure 26:
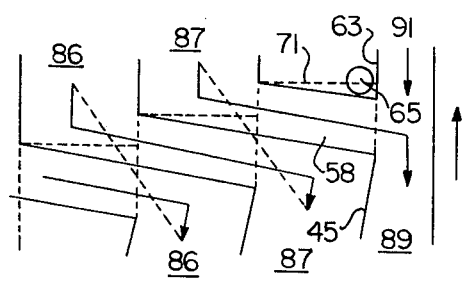
Figure 24:
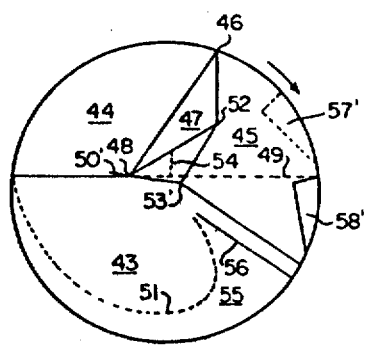

The liquid transfer channels are slightly inclined to the axis of the drum in order to facilitate the complete outflow of the liquid. The prespective view of FIG. 22 shows a very simple structure of a barrier 76, whose lower portion 77 that contacts the surface of the drum is turned upstream by an angle of about 10°. Surfaces 78 and 79 delimit the channel which passes through the spiral turn in front of the barrier, while a channel 80 emerges in the spiral turn itself. The linking of the chutes at the two ends of the drum is shown in FIG. 23, as seen from outside the drum, as opposed to form the inside of the drum as is the case in FIG. 10. The feed liquid enters through a duct 81, passes through a spiral turn 82, is forced back by a barrier 83, flows out to a spiral turn 84 where it receives a second quantity of liquid arriving through duct 81, is forced back by a barrier 85 and so on until it reaches the end of the drum where, after passing through spiral turns 86 and 87, it flows out of the apparatus though a duct 88 which traverses the wall of the drum. The transporting liquid fed with the solids into an inlet spiral turn 89 passes through perforate partition 63 and leaves the apparatus through duct 65. The shaded area represents the start of the raising element whose end is indicated by barrier 71 in FIG. 20. FIG. 26 corresponds to the right-hand portion of FIG. 23 and shows the modification in the linking of the liquid transfer channels in the embodiment employing the inlet spiral turn of FIG. 25 for feeding the solids without a transporting liquid. The liquid which passed through spiral turns 86 and 87 is directed toward a spiral turn 89 for the inlet of solids, instead of being removed through an opening 88. After it passes through raising element 70' (which is not shown in FIG. 26), the liquid is divided by solid surface 63 in two portions, one leaving the drum through opening 65, while the other is recycled into spiral turn 89, as shown by arrow 91.

The described apparatus exhibits numerous advantages in relation to the apparatus used until the present time. The intersecting partial flows of prior art devices are eliminated and the countercurrent flow principle, according to which every liquid fraction successively meets every fraction of solids, is strictly obtained in the present invention. Due to the curvature of the raising elements, the time available for the separation of the liquid and the solids is increased, the separation is more complete because the draining of the deep layers of solids can be achieved during the gradual dropping of the upper layers, and the procedure is useful because the separated liquid is not readmixed later on to the same solids. The greater efficiency of separation makes it possible to reduce the number of separation operations or to increase the rotational speed while obtaining the same degree of extraction. The amount of abrasion is reduced since the solids do not glide or slide on the perforate surfaces, and, when treating the beet cossettes, the cossettes are not broken, which would detrimentally affect their permeability. The solids are lifted to a lower height, which reduces the torque required for rotation. Finally, the construction is less costly, because the apparatus is lighter since the diametral plane has been eliminated and the liquid transfer channels have a shorter length, or are even completely eliminated if the angle alpha is lower than 360°. The greater length of the raising elements is more than compensated for by the fact that the number of raising elements is reduced by one-half. The lower weight of the apparatus also makes it possible to reduce the size of the foundations required for installation of the apparatus.

In addition to the extraction of sucrose from sugar beets or sugar cane, the apparatus of the invention may be used for extracting apple juice, tannins from nut galls, juice from liquorice roots, and generally any substance which is soluble in a solvent, contained in a solid or as a coating on a solid.

It is to be understood that the present invention is not restricted to the above described embodiments, since various modifications may be made thereto without departing from the scope of the invention.

What I claim is:

1. An apparatus for the extraction of materials from solids by countercurrent contact of said solids with a liquid, said apparatus comprising:
    a rotary drum having an axis which is horizontal or only slightly inclined;
    an inner partition positioned within said drum, said partition being substantially in the shape of a spiral including plural spiral turns with spaces therebetween;
    each said space having therein raising element means for lifting solids from a liquid;
    each said space having therein barrier means over which said solids drop from a respective said raising element means and for stopping and forcing said liquid back into another said space during rotation of said drum; and
    at least one of said raising element means having a curvature such that, during said rotation of said drum, said solids lifted from said liquid gradually drop in successive fractions over said barrier means without sliding on said raising element means.

2. An apparatus as claimed in claim 1, wherein at least one of said raising element means is attached at at least one point to the respective said barrier means.

3. An apparatus as claimed in claim 1, wherein the projection of at least one of said raising element means onto a plane perpendicular to said axis of said drum is in the form of a curve having a configuration such that a rectilinear tangent to said curve sweeps over an angle of at least 90° while sliding from one end of said raising element means to the other end thereof.

4. An apparatus as claimed in claim 1, wherein the projection of at least one said raising element means onto a plane perpendicular to said axis of said drum is substantially in the form of a spiral inscribed within a central angle of between 70° and 450°, one end of said spiral being attached to the wall of said drum and the other end of said spiral being located at a position spaced from said axis of said drum by a distance of between one-third and three-quarters of the radius of said drum.

5. An apparatus as claimed in claim 1, wherein at least one of said barrier means is extended beyond the point of attachment thereof to the respective said raising element means to a position spaced from said axis of said drum by less than one-third of the radius of said drum.

6. An apparatus as claimed in claim 5, wherein said raising element means is extended to a position spaced from said axis of said drum by a distance equalling that reached from said barrier means.

7. An apparatus as claimed in claim 1, wherein the projection of at least one of said raising element means onto a plane perpendicular to said axis of said drum is substantially in the form of an ellipse inscribed within a central angle of between 70° and 270°, one end of said ellipse being attached to the wall of said drum and the other end of said ellipse being located at a position spaced from said axis of said drum by a distance less than three-quarters of the radius of said drum.

8. An apparatus as claimed in claim 7, wherein said central angle is between 90° and 180°.

9. An apparatus as claimed in claim 7, wherein said distance is between one-tenth and one-third of said radius of said drum.

10. An apparatus as claimed in claim 1, wherein the projection of at least one of said raising element means onto a plane perpendicular to said axis of said drum is substantially in the form of a circle inscribed within a central angle of between 70° and 270°, one end of said circle being attached to the wall of said drum and the other end of said circle being located at a position spaced from said axis of said drum by a distance less than three-quarters of the radius of said drum.

11. An apparatus as claimed in claim 1, wherein the projection of at least one of said raising element means onto a plane perpendicular to said axis of said drum is substantially in the form of a spiral inscribed within a central angle of between 70° and 360°, one end of said spiral being attached to the wall of said drum and the other end of said spiral being extended by a portion of ellipse inscribed within a central angle of between 70° and 270°, an outer end of said ellipse being located at a position spaced from said axis of said drum by a distance less than three-quarters of the radius of said drum.

12. An apparatus as claimed in claim 11, wherein said central angle of said ellipse is between 90° and 180°.

13. An apparatus as claimed in claim 11, wherein said distance is between one-tenth and one-third of said radius of said drum.

14. An apparatus as claimed in claim 1, further comprising at least one gap means, provided between said barrier means and the end of said raising element which is closest to said axis of said drum for forming a throat to said liquid.

15. An apparatus as claimed in claim 1, wherein the distance between the end of at least one said raising element means closest to said axis of said drum and said axis of said drum is greater than the distance between the adjacent end of the corresponding said barrier means and said axis of said drum.

16. An apparatus as claimed in claim 1, wherein the shape of said barrier means is a shape selected from the group consisting of a plane radial surface, a plane oblique surface, a curved surface, and a surface whose section along a plane perpendicular to said axis of said drum is in the form of a portion of a parabola.

17. An apparatus as claimed in claim 1, wherein at least one of said raising element means comprises a perforate plate.

18. An apparatus as claimed in claim 1, wherein at least one of said raising element means comprises a screen.

19. An apparatus as claimed in claim 1, wherein at least one of said raising element means has a concave face having thereon at least one spur-shaped stop member.

20. An apparatus as claimed in claim 19, wherein said stop member comprises a fold in said raising element means, said fold extending in a direction parallel to said axis of said drum.

21. An apparatus as claimed in claim 1, wherein said drum includes an inner structure comprising at least one fixed component positioned between two consecutive said raising element means at a position spaced from the surface of said drum by a distance substantially equal to the desired maximum height of a mixture of submerged solids and said liquid.

22. An apparatus as claimed in claim 21, wherein the shape of said fixed component is a shape selected from the group consisting of a radial surface, a plane surface inclined with respect to said axis of said drum, a curved surface whose curvature is preferably concentric to said drum, and a plurality of plane surfaces connected to form a polyhedral angular member.

23. An apparatus as claimed in claim 21, wherein said fixed component is an element selected from the group consisting of solid plates, perforate plates, screens, and bars.

24. An apparatus as claimed in claim 1, wherein said inner spiral partition includes an inlet spiral turn for the introduction of solids, said inlet spiral being inscribed within a central angle of between 360° and 540°, said inlet spiral turn having a width increasing during the first revolution thereof, said inlet spiral turn containing an inlet raising element inscribed within a central angle of at least 240°, the width of said inlet raising element corresponding to that of said spiral turn.

25. An apparatus as claimed in claim 24, wherein said inlet spiral turn is inscribed within a central angle of between 430° and 470°.

26. An apparatus as claimed in claim 24, wherein said inlet raising element is inscribed within a central angle of between 270° and 450°.

27. An apparatus as claimed in claim 1, wherein said inner spiral partition includes an inlet spiral turn having an opening through which a portion of the liquid passed through said raising element is recycled and reutilized for transporting to said raising element the solids introduced into the apparatus.

28. An apparatus as claimed in claim 1, wherein said inner spiral partition includes an outer spiral turn serving as an outlet for said solids, said barrier means of said outer spiral turn being extended by a curved plate which partly surrounds a conveying screw concentric to said drum and which is joined to said inner spiral partition so as to close said outer spiral turn on itself.

29. An apparatus as claimed in claim 1, wherein said inner spiral partition includes an outer spiral turn serving as an outlet for said solids, and further comprising a liquid feed conduit which ends on the downstream side of the said barrier means preceding that of said outer spiral turn, said liquid flowing by gravity from said liquid feed conduit alternately upstream and downstream from the said barrier means, depending on the position of said drum.

30. An apparatus as claimed in claim 1, wherein the projections of two consecutive said raising element means onto a plane perpendicular to said axis of said drum are shifted by an angle alpha in relation to one another around said axis of said drum.

31. An apparatus as claimed in claim 30, wherein the product of said angle alpha and the number of said raising element means in said inner spiral partition is substantially equal to a multiple of 360°, incommensurable with the number of said raising element means.

32. An apparatus as claimed in claim 30, wherein said angle alpha is substantially equal to $n \times 360°/k+1$, wherein k is the ratio between the time of stay of said liquid and the time of stay of said solids in said drum, and n is the number of times said liquid traverses said inner partition substantially in the form of a spiral when said liquid is forced back by said barrier means.

33. An apparatus as claimed in claim 30, wherein said angle alpha is selected such that the gradual dropping of said solids under the effect of rotation of said drum is more advanced in the said spiral turn wherein the liquid proceeds than in the said spiral turn from which said liquid flows and wherein it is being separated from said solids.

34. An apparatus as claimed in claim 30, wherein said angle alpha is selected such that the outflow of said liquid into the said spiral turn toward which said liquid is displaced is retarded until said solids begin to drop over said barrier means in such spiral turn under the effect of rotation of said drum.

35. An apparatus as claimed in claim 30, wherein said angle alpha increases gradually in the direction of advancement of said solids.

36. An apparatus as claimed in claim 30, wherein said inner spiral partition comprises a sequence of concentric circular segments extending substantially perpendicular to said axis of said drum, adjacent said circular segments being connected by at least one oblique flap.

37. An apparatus as claimed in claim 36, wherein said circular segments are shifted by said angle alpha in relation to one another around said axis of said drum.

38. An apparatus as claimed in claim 30, wherein said inner spiral partition comprises a sequence of circular portions each delimited by a pair of rectilinear segments and jointly including said angle alpha, the points of intersection of each said pair of rectilinear segments being located at a position spaced from said axis of said drum by a distance of between one-tenth and one-half of the radius of said drum.

39. An apparatus as claimed in claim 38, wherein each said pair of rectilinear segments have unequal lengths at a ratio of five to four.

40. An apparatus as claimed in claim 38, wherein said distance is approximately one-third of said radius of said drum.

41. An apparatus as claimed in claim 1, wherein said inner spiral partition is shifted in the axial direction between two adjacent said spiral turns in the area of at least one said raising element means.

42. An apparatus as claimed in claim 1, wherein said inner spiral partition has a variable pitch, the width of said spiral turns diminishing gradually in the direction of advancement of said solids.

* * * * *

UNITED STATES PATENT AND TRADEMARK OFFICE
CERTIFICATE OF CORRECTION

PATENT NO. : 4,248,835
DATED : February 3, 1981
INVENTOR(S) : Guy V. Genie

It is certified that error appears in the above-identified patent and that said Letters Patent are hereby corrected as shown below:

In the drawings, Figure 24 should appear as shown on the attached sheet.

In the drawings, Figure 27 is to be added per the attachment.

On the Title page "26 Drawing Figures" should read -- 27 Drawing Figures --.

Signed and Sealed this

First Day of December 1981

[SEAL]

Attest:

Attesting Officer

GERALD J. MOSSINGHOFF

Commissioner of Patents and Trademarks